US012807270B2

(12) United States Patent
Mercat

(10) Patent No.: US 12,807,270 B2
(45) Date of Patent: Nov. 24, 2026

(54) TORQUE TRANSMISSION DEVICE, ELECTRIC POWER ASSISTANCE DEVICE AND ASSOCIATED CYCLE

(71) Applicant: MAVIC GROUP, Chavanod (FR)

(72) Inventor: Jean-Pierre Mercat, Chavanod (FR)

(73) Assignee: MAVIC GROUP, Chavanod (FR)

( * ) Notice: Subject to any disclaimer, the term of this patent is extended or adjusted under 35 U.S.C. 154(b) by 874 days.

(21) Appl. No.: 18/046,647

(22) Filed: Oct. 14, 2022

(65) Prior Publication Data

US 2023/0182857 A1 Jun. 15, 2023

(30) Foreign Application Priority Data

Oct. 14, 2021 (FR) .................................... 21 10906

(51) Int. Cl.
*B62M 6/45* (2010.01)
*B62M 6/55* (2010.01)
*F16D 41/28* (2006.01)

(52) U.S. Cl.
CPC ................ *B62M 6/45* (2013.01); *B62M 6/55* (2013.01); *F16D 41/28* (2013.01)

(58) Field of Classification Search
CPC ........... B62M 6/45; B62M 6/55; F16D 41/28
USPC ......................................................... 180/220
See application file for complete search history.

(56) References Cited

U.S. PATENT DOCUMENTS 3,258,988 A * 7/1966 Schmidt .................. B62D 1/11 74/68
4,125,028 A * 11/1978 Gordon .................... H03J 1/06 74/10.8
10,059,399 B2 * 8/2018 Hayslett ................ B62M 11/18
2021/0123480 A1 * 4/2021 Sand ........................ F16D 3/60

FOREIGN PATENT DOCUMENTS

FR 3091516 A1 * 7/2020 ............ B62M 11/14
JP 4-219526 A 8/1992
JP H07279987 A * 10/1995

OTHER PUBLICATIONS

French Preliminary Search Report Issued Jun. 27, 2022 in French Application 21 10906 filed on Oct. 14, 2021 (with English Translation of Categories of Cited Documents), 10 pages.

* cited by examiner

*Primary Examiner* — Jacob D Knutson
*Assistant Examiner* — Mohamed M Medani
(74) *Attorney, Agent, or Firm* — Oblon, McClelland, Maier & Neustadt, L.L.P.

(57) ABSTRACT

A torque transmission device includes an input disc, an output disc, an intermediate disc positioned between the input disc and the output disc, a first pair of links coupled by a first side to the input disc and by a second side, opposite to the first side, to the intermediate disc, the links of the first pair being positioned diametrically opposite each other relative to the intermediate central axis, a second pair of links coupled by a first side to the intermediate disc and by a second side, opposite to the first side, to the output disc, the
(Continued)

links of the second pair being positioned diametrically opposite each other relative to the intermediate central axis of the intermediate disc, the two pairs of links being aligned in two respective directions perpendicular to each other.

13 Claims, 12 Drawing Sheets

[Fig 1]
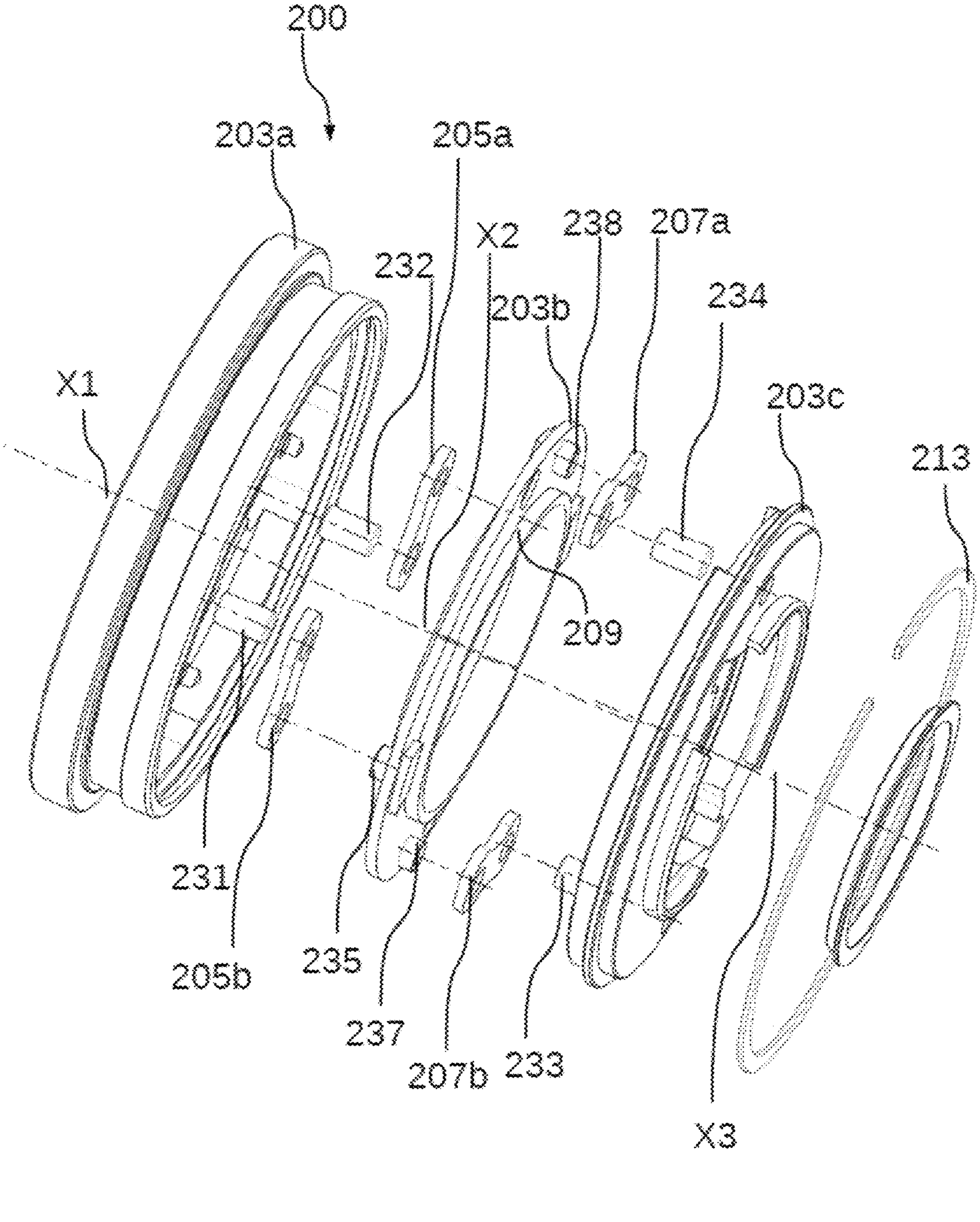

[Fig 2]
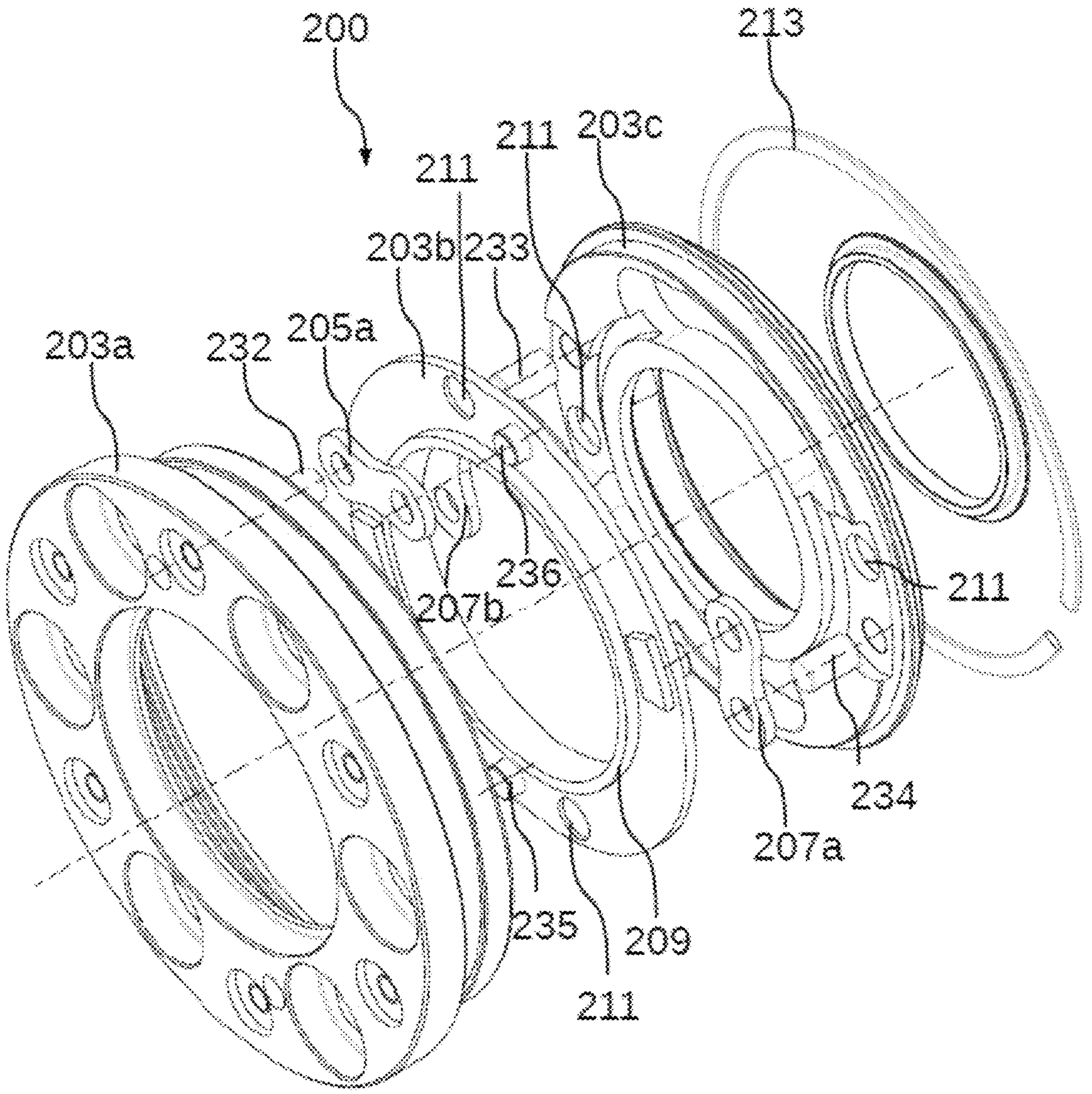

[Fig 3a]
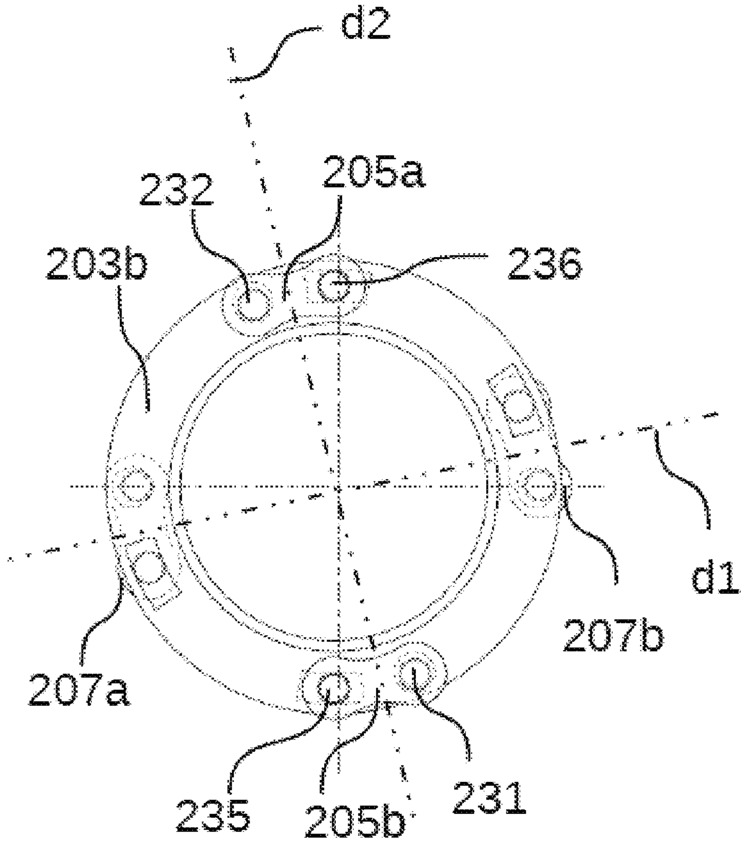

[Fig 3b]
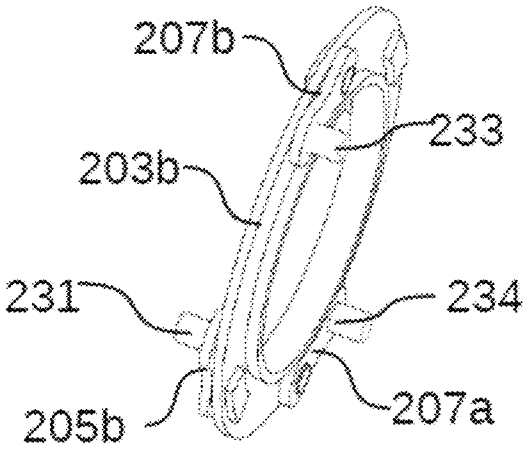

[Fig 3c]
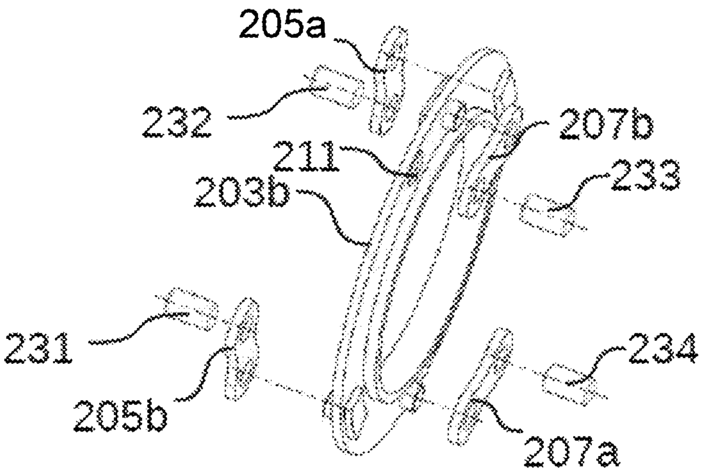

[Fig 4]
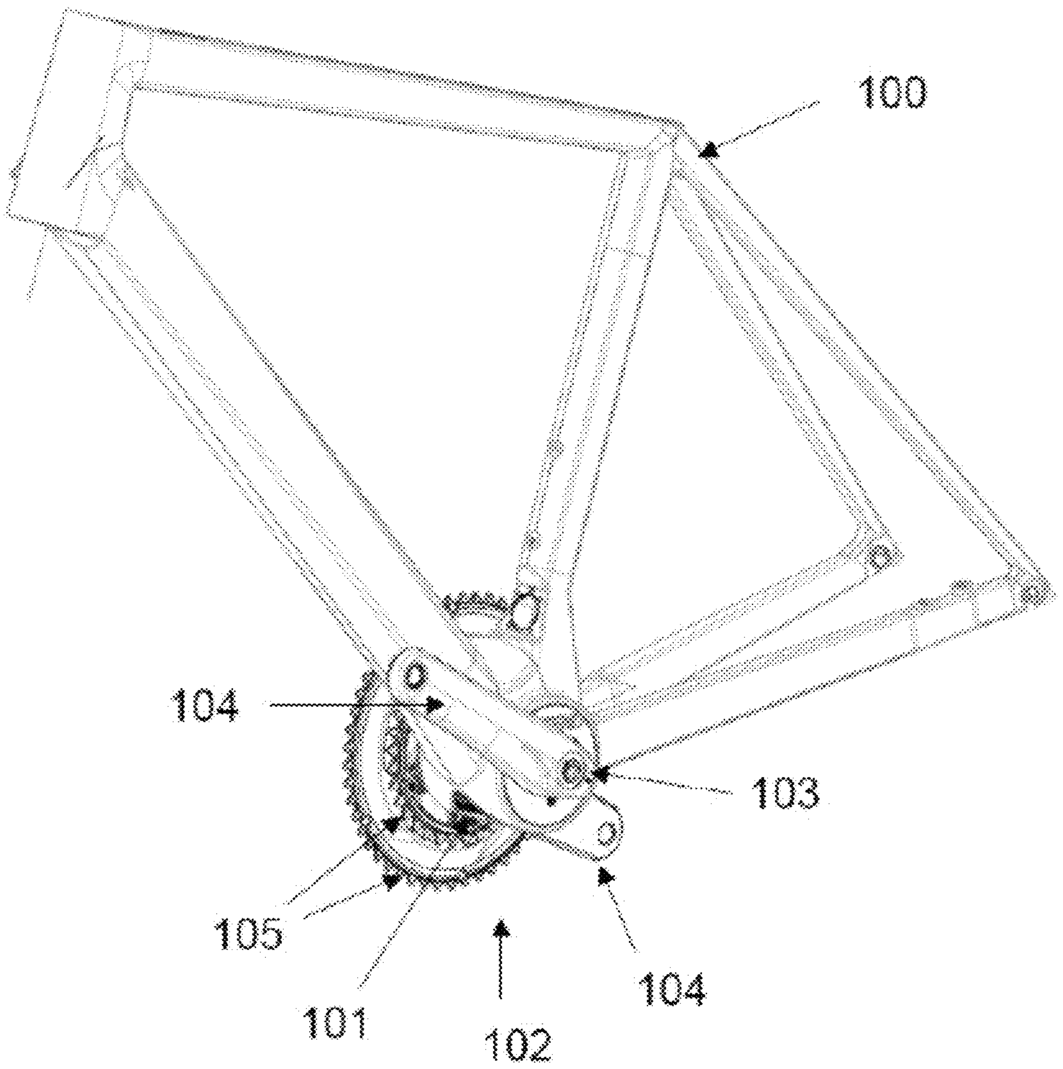

[Fig 5]
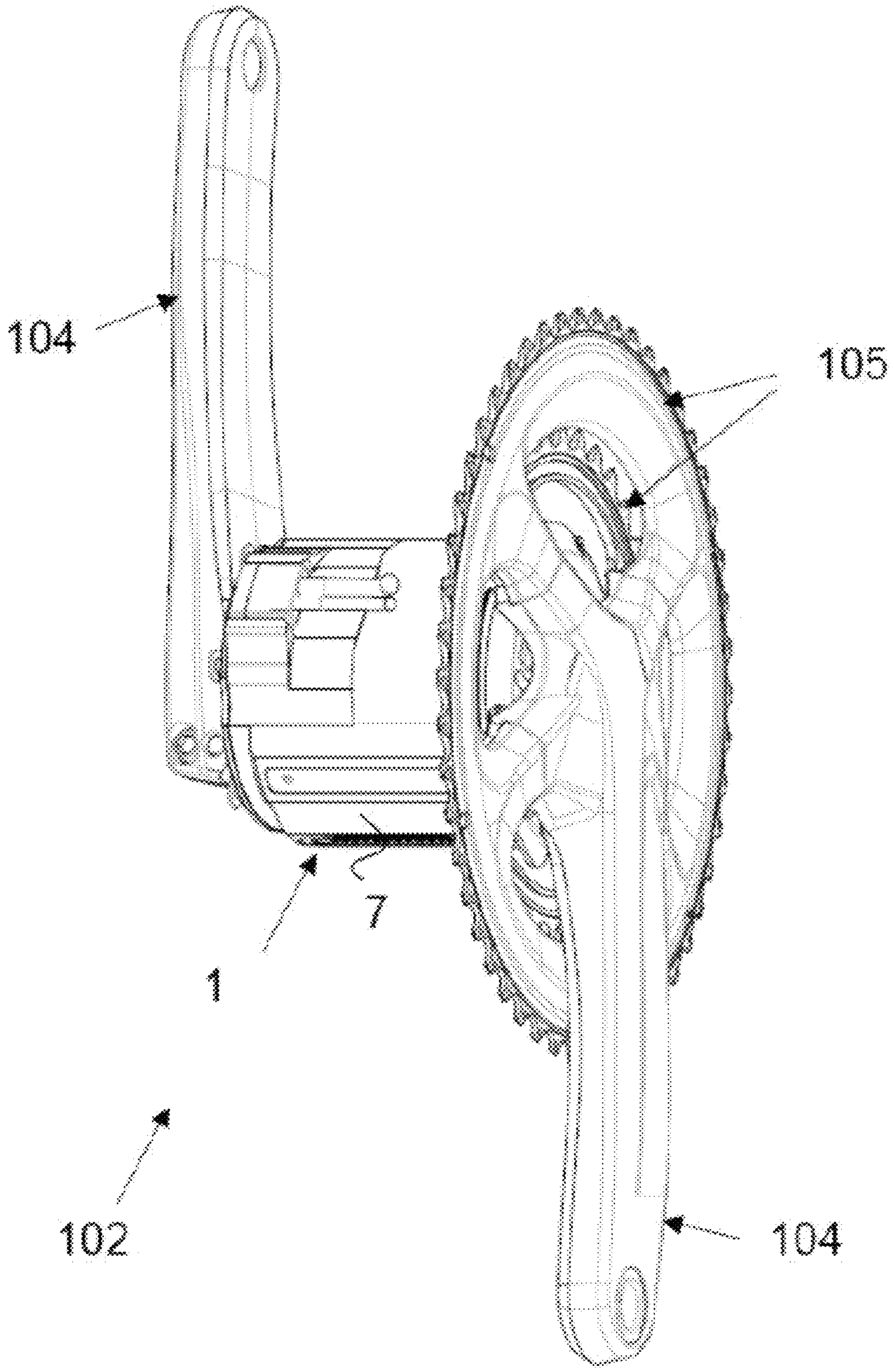

[Fig 6]
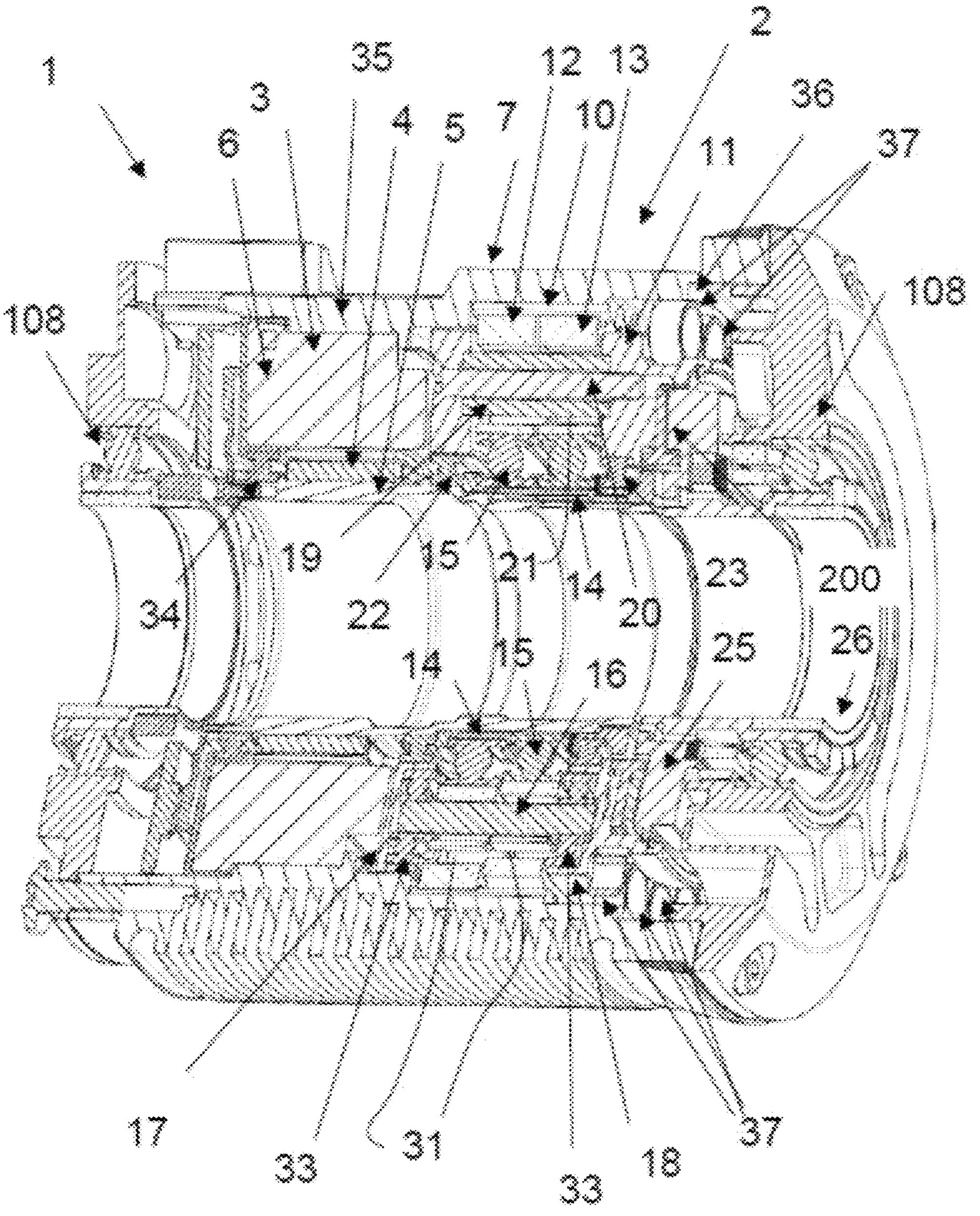

[Fig 7]
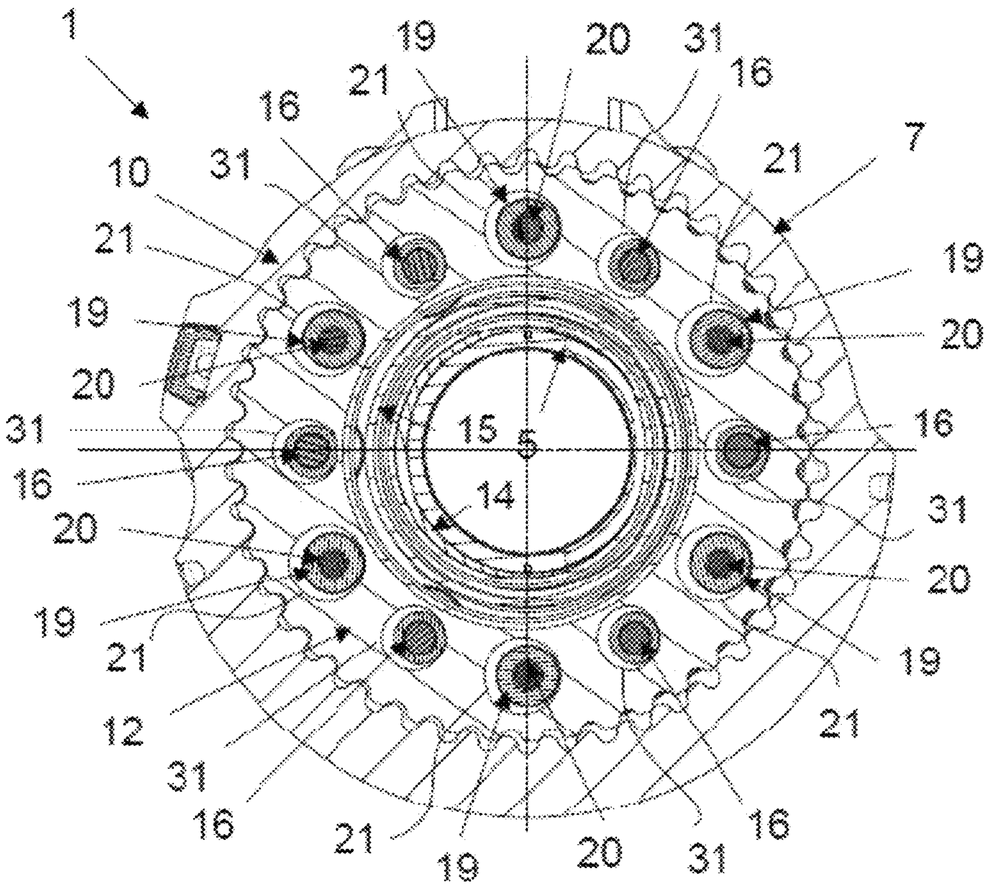

[Fig 8]
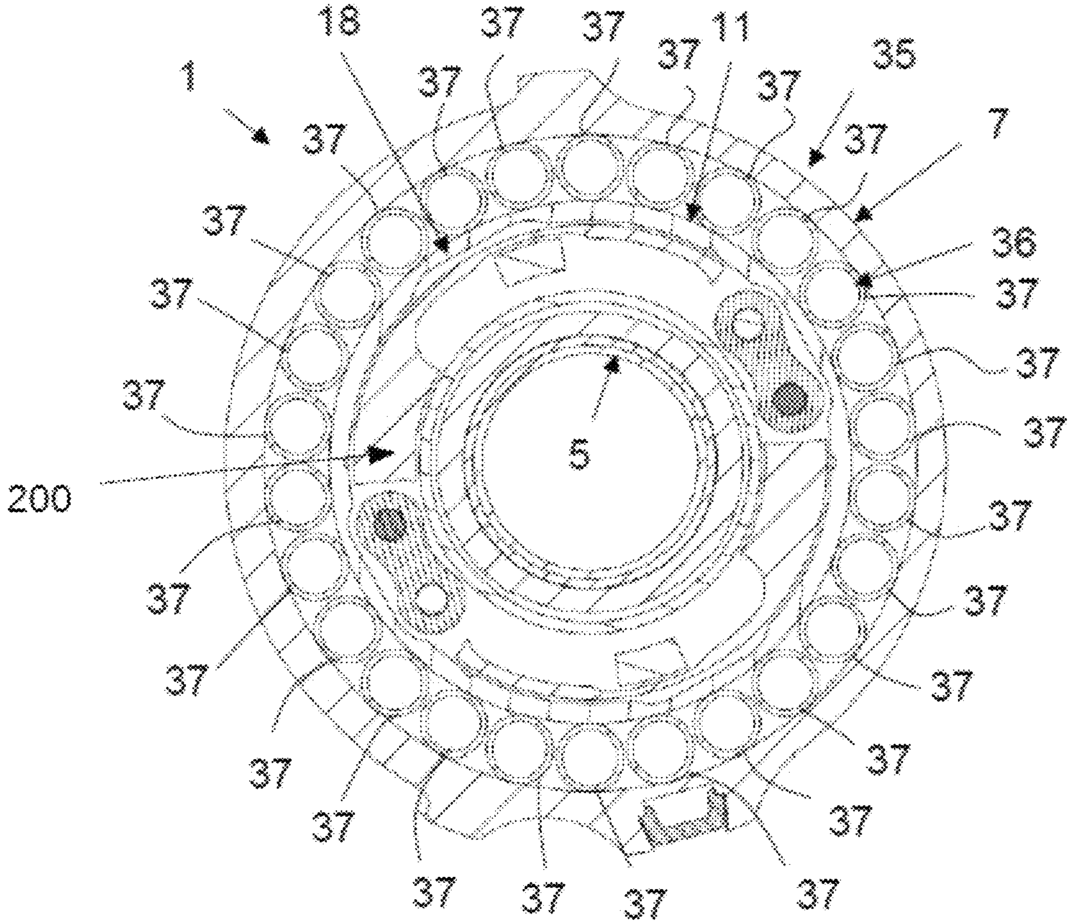

[Fig 9]
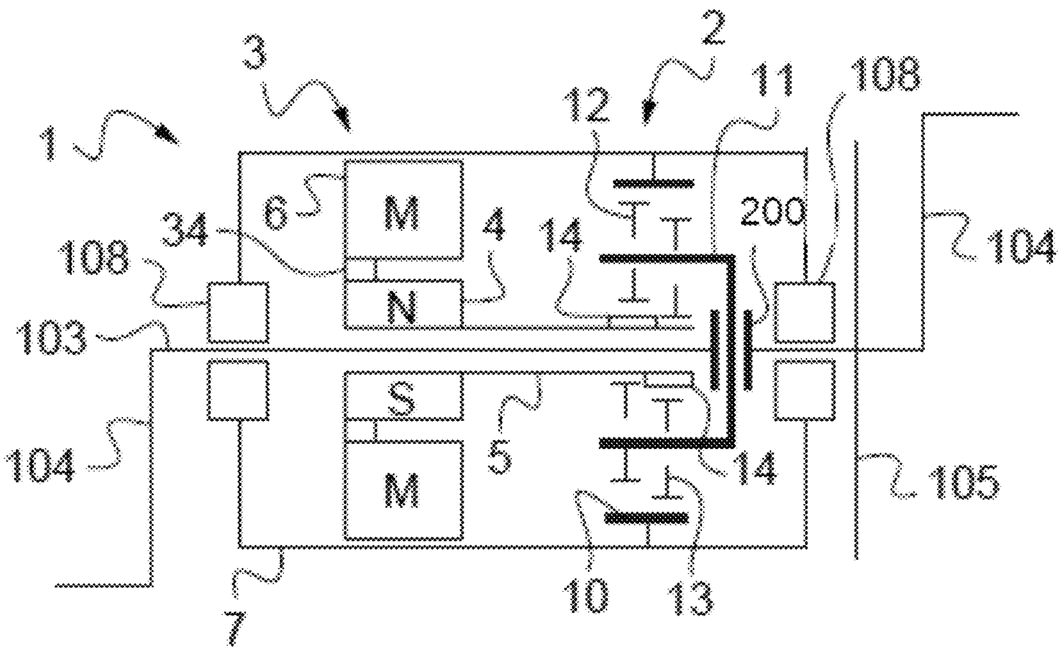

[Fig 10]
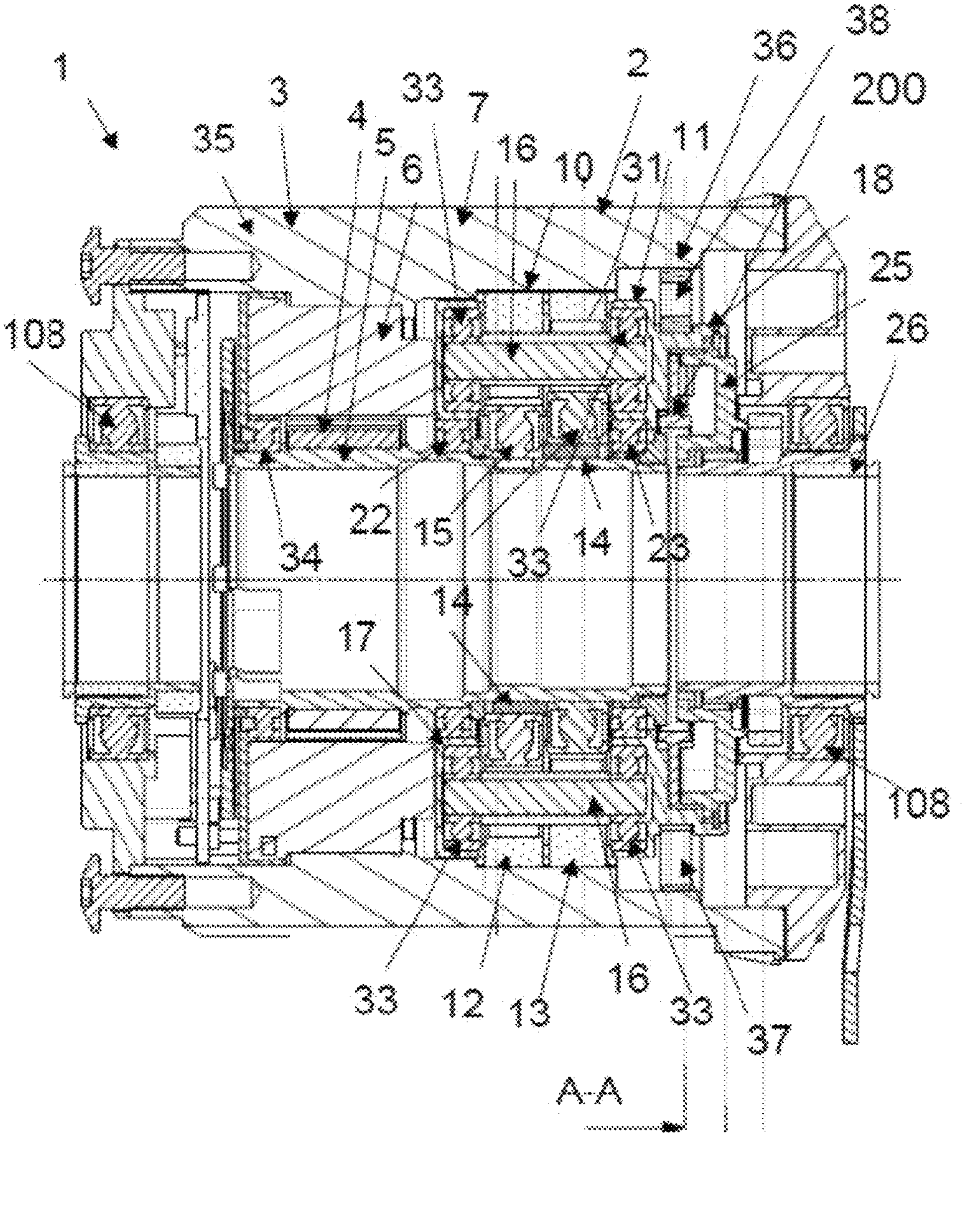

TORQUE TRANSMISSION DEVICE, ELECTRIC POWER ASSISTANCE DEVICE AND ASSOCIATED CYCLE

CROSS-REFERENCE TO RELATED APPLICATION

The present application claims priority to French Patent Application No: 21 10906, filed Oct. 14, 2021. The benefit of priority is claimed to the foregoing, and the entire content is incorporated herein by reference.

BACKGROUND

The present invention relates to a torque transmission device, in particular for a geared motor, an electric power assistance device and a cycle comprising said torque transmission device.

Electric power-assisted bicycles are becoming increasingly widespread as they attract various audiences, including both individuals wishing to replace their car with a more practical, environmentally-friendly vehicle, and sportspeople seeking assistance in order to reduce the effort required during pedalling, in particular on very steep ascents.

Various technologies have been developed to meet the needs of these different users.

In the case of electric power-assisted bicycles for sporting use, it is important to users that the weight of the bicycle is kept under control and the transmission losses are limited, as sportspeople wish to use their bicycle as often as possible without calling on the electric power assistance, and thus retain the feel of a conventional bicycle. It is also important to obtain a bicycle with an appearance as close as possible to that of a conventional bicycle.

One of the technologies that makes it possible to adapt satisfactorily to the cyclist's pedalling is to position the electric motor around the crank axle in the bottom bracket shell holding the crank axle. The drive will thus be able to receive the transmission ratio that is the ratio between the rotation speed of the rear wheel and the pedalling cadence, this transmission ratio being selected by the cyclist in order to optimize their pedalling cadence under all circumstances, which will therefore also have the effect of adjusting the motor speed so that it is operating efficiently and is thus able to deliver very high assistance torque to the rear wheel (at a lower speed) during very steep ascents.

Users of these electric power-assisted bicycles also desire a very quiet drive so that they can fully enjoy cycling in peace and quiet.

The spacing between the right and left pedals is a very important element for cyclists, in particular sport cyclists. This spacing between the outsides of the two crank arms is commonly known as the Q factor, and has a value of 146 mm for a road bicycle and up to 158 mm for a mountain bike (MTB), while the electric power-assisted motor units significantly increase this Q factor to 163 mm to 220 mm wide. The motor unit must incorporate a number of elements such as a torque sensor, a motor, and a reducer, as well as at least one free wheel. All of these components as a whole occupy a lot of space, resulting in the increase in the Q factor. This increase can be felt immediately by an experienced cyclist; during the pedalling motion, the cyclist's legs do not form a dynamically balanced mechanical system, with the limbs undergoing alternating accelerations that generate significant dynamic loads that increase with the square of the pedalling cadence. The imbalance of this system also increases with the pedal spacing, and the increase thereof thus inevitably reduces the cyclist's pedalling cadence and therefore the mechanical power developed. In addition, the pedal spacing poses safety problems when the cyclist wishes to continue to pedal in bends, as the tilt of the bicycle in the bend brings the pedal situated on the inside of the bend closer to the ground, with the risk that it will make contact with the ground and cause the cyclist to fall. The increase in the Q factor thus makes pedalling in bends much more dangerous. It is therefore important to design a drive that is axially very narrow, in line with the Q factor of non-power-assisted high-performance bicycles.

In order to use a small, light electric motor, in particular with a small diameter, it is preferable to limit its torque. Low torque from the electric motor leads to a high rotation speed of the output shaft in order to obtain the desired power. A reducer must then be coupled to the electric motor in order to obtain a rotation speed suited to the user's pedalling frequency. In addition, a free wheel is necessary in order to decouple the motor when the cyclist no longer needs the motor's assistance, for example when their speed exceeds the legal maximum assisted speed or when they no longer wish to be assisted. This free wheel is also necessary in order to avoid damaging the electric motor, in particular when the user back-pedals. These various elements can be mounted coaxially with the crank axle and form a transmission line configured to transmit the torque supplied by the electric motor to the crank axle.

The production of the reducer and of the elements of the power transmission line requires manufacturing tolerances, and in particular coaxiality tolerances, the effects of which can be periodically combined. The production of all of these parts requires the greatest of care in order to obtain a high-precision assembly, but reducing the tolerance ranges very quickly increases the manufacturing cost.

In addition, when the user applies a strong force to the pedals, this tends to deform the crank axle.

These manufacturing tolerances, together with this deformation, tend to distort the coaxiality between the crank axle and the transmission line elements, which creates stresses and increases the friction, in particular in the bearings positioned between the transmission line elements and the crank axle. This friction creates a loss of efficiency that can be unpleasant for the user, in particular when they are using the bicycle without electric power assistance, as the cyclist must provide additional effort in order to counter the friction. This friction also generates wear, as well as periodic vibrations and noise that are unpleasant for a cyclist wishing to ride in peace and quiet.

In order to overcome this problem of the lack of coaxiality between two mechanical assemblies, it is known practice to use an Oldham coupling. Oldham couplings are homokinetic joints, and consist of a first slider between an input disc and an intermediate disc and a second slider perpendicular to the first, connecting the intermediate disc to the output disc. The two sliders are preferably each formed by a radial tongue sliding in a radial groove. The problem encountered by this type of coupling is that the sliders generate large amounts of alternating friction, which is the source of significant undesirable radial forces; on each revolution, each of the sliders will move back and forth, which will cause two reversals of direction of the radial component of friction, and as the two sliders are offset by a quarter of a turn, the orientation of the friction will therefore successively change four times per revolution, generating significant radial excitation of the input and output shafts, leading to considerable noise. This problem of friction could be solved by inserting rolling elements in the sliders, but this solution is very costly and occupies a lot of space axially, and cannot therefore be applied to a compact geared motor.

A low-cost solution must therefore be provided for obtaining electric power assistance, having limited weight and footprint so that it can be positioned in the bottom bracket shell and making it possible to limit the friction and noise linked to the deformation of the crank axle under the effect of pedalling by the user.

BRIEF SUMMARY

Likewise, these same problems can be encountered for other equipment that uses electric power assistance devices, such as for example electric power assistance devices for exoskeletons, portable electrical equipment or robotic arms, in which operating noise and compactness are important criteria. To this end, the invention relates to a torque transmission device, in particular for a geared motor, comprising:

- an input disc extending in a plane perpendicular to a central input axis,
- an output disc extending in a plane perpendicular to a central output axis,
- an intermediate disc positioned between the input disc and the output disc and extending in a plane perpendicular to an intermediate central axis,
- a first pair of links coupled by a first side to the input disc and by a second side, opposite to the first side, to the intermediate disc, the links of the first pair being positioned diametrically opposite each other relative to an intermediate central axis,
- a second pair of links coupled by a first side to the intermediate disc and by a second side, opposite to the first side, to the output disc, the links of the second pair being positioned diametrically opposite each other relative to the intermediate central axis, the two pairs of links being aligned in two respective directions perpendicular to each other so as to allow torque transmission even if the central input axis and the central output axis are not coaxial, in which the input disc comprises two transmission pins extending parallel to the central input axis and received in two respective first holes associated with a first end of the respective links of the first pair, the intermediate disc comprising two first transmission pins extending parallel to its central axis, positioned on a first face of the intermediate disc and received in two respective second holes associated with a second end of the respective links of the first pair, and two second transmission pins extending parallel to its central axis, positioned on a second face of the intermediate disc and received in two respective first holes associated with the first side of the respective links of the second pair, the output disc comprising two transmission pins extending parallel to the central output axis and received in two respective second holes associated with the second side of the respective links of the second pair, and in which the first and second transmission pins of the intermediate disc are positioned so that the links of the first and second pairs work in tension in a first torque transmission direction and in compression in a second torque transmission direction, opposite to the first torque transmission direction.

Using two pairs of links aligned in two respective directions perpendicular to each other connecting discs mounted rotatably about a central axis makes it possible to obtain torque transmission between two spindles that can be non-coaxial, in the same way as an Oldham coupling, while having a reduced footprint and in particular a reduced axial width. All of the links working in tension in one direction of rotation makes it possible to limit the wear of the torque transmission device when it is always used in the same rotation direction, as is the case for a cycle in which a free wheel device is associated with the torque transmission device, and to avoid the buckling risks that can be encountered with links stressed in compression.

It must be noted that it is possible for the links of the first or second pair not to be strictly diametrically opposite each other, but 10° away from a diametrically opposed direction.

It must also be noted that the two pairs of links can be aligned in two directions that are not strictly perpendicular, but that form an angle of between 80° and 100°.

According to another aspect of the present invention, the links of the first pair are rotatably mounted with respect to the transmission pins of the input disc and with respect to the first transmission pins of the intermediate disc, and the links of the second pair are rotatably mounted with respect to the second transmission pins of the intermediate disc and with respect to the transmission pins of the output disc.

According to another aspect of the present invention, the links are standard chain links.

According to another aspect of the present invention, the intermediate disc comprises a collar extending axially on either side of the centre of the disc so as to form a T-shaped cross-section in order to prevent said intermediate disc from becoming out-of-round when the torque transmission device is under load.

According to another aspect of the present invention, the links are positioned in the thickness formed by the collar of the intermediate disc.

According to another aspect of the present invention, the transmission pins protrude relative to the links and recesses are arranged in the input disc, the intermediate disc and the output disc facing the transmission pins associated with an adjacent disc to allow the transmission pins to protrude.

The present invention also relates to an electric power assistance device, in particular for a cycle, comprising:

- an electric motor comprising an output shaft and configured to be mounted about a central axle,
- a reducer configured to be mounted about the central axle,
- a free wheel configured to be mounted about the central axle,
- a torque transmission device as described above, configured to be mounted about the central axle, the reducer, the free wheel and the torque transmission device forming a torque transmission line between the output shaft of the electric motor and an output spindle of the electric power assistance device.

Such an assistance device for a cycle increases the number of degrees of freedom and thus limits friction when the user, by pedalling, introduces deformations and stresses in the crankset, and has a reduced footprint, facilitating its incorporation into the bottom bracket shell.

According to another aspect of the present invention, the reducer comprises an input configured to be rotatably coupled to the output shaft of the electric motor and an output configured to be rotatably coupled to the input disc of the torque transmission device.

According to another aspect of the present invention, the free wheel comprises an input configured to be rotatably coupled to the output disc of the torque transmission device and an output configured to be rotatably coupled to the output spindle of the electric power assistance device.

According to another aspect of the present invention, the central crank axle of the cycle is held in position by a single pair of bearings positioned between a frame of the cycle and the central crank axle.

Using a single pair of bearings to hold the crank axle reduces the stresses between the geared motor and the crankset and thus makes it possible to reduce the friction and noise caused by these stresses.

According to another aspect of the present invention, the electric motor, the reducer, the torque transmission device and the free wheel are configured to be positioned adjacent to each other along the central crank axle.

The present invention also relates to a cycle comprising a frame, a central crank axle rotatably mounted on the frame and an electric power assistance device as described above.

According to another aspect of the present invention, the electric motor and the reducer are mounted on the frame independently of the central crank axle.

Further features and advantages of the invention will become more clearly apparent upon reading the following description, which is given by way of illustrative and non-limiting example, and the appended drawings, in which:

BRIEF DESCRIPTION OF THE DRAWINGS

FIG. 1 shows a first exploded perspective schematic view of a torque transmission device according to one embodiment of the present invention;

FIG. 2 shows a second exploded perspective schematic view of the torque transmission device in FIG. 1;

FIG. 3*a* shows a front view of an intermediate disc and the two pairs of links if the axis X1 of the input disc is not aligned with the axis X3 of the output disc;

FIG. 3*b* shows a perspective view of an intermediate disc and the two pairs of links according to FIG. 3*a;*

FIG. 3*c* shows an exploded view of an intermediate disc and the two pairs of links according to FIG. 3*a;*

FIG. 4 shows a diagram of a cycle frame provided with an electric power assistance device for a cycle;

FIG. 5 shows a perspective view of a crankset and an electric power assistance device for a cycle;

FIG. 6 shows a perspective axial cross-sectional view of an electric power assistance device for a cycle according to the present invention;

FIG. 7 shows a radial cross-sectional view of an electric power assistance device for a cycle along a first line;

FIG. 8 shows a radial cross-sectional view of an electric power assistance device for a cycle along a second line;

FIG. 9 shows a diagrammatic representation of an electric power assistance device for a cycle according to the present invention;

FIG. 10 shows an axial cross-sectional view of an electric power assistance device for a cycle according to the present invention.

DETAILED DESCRIPTION

In these figures, identical elements have the same reference signs.

The following embodiments are examples. Although the description refers to one or more embodiments, this does not necessarily mean that each reference relates to the same embodiment, or that the features apply to just one embodiment. Individual features of different embodiments can also be combined or interchanged in order to create other embodiments.

In the present description, some elements or parameters can be given ordinal numbers, such as, for example, first element or second element, as well as first parameter and second parameter or even first criterion and second criterion, etc. In this case, the ordinal numbering is simply to differentiate between and denote elements or parameters or criteria that are similar, but not identical. This ordinal numbering does not imply any priority of one element, parameter or criterion over another and such numbering can easily be interchanged without departing from the scope of the present description. Likewise, this ordinal numbering does not imply any order in time for example when considering one criterion or another.

FIGS. 1 and 2 show perspective views of a torque transmission device 200 according to one embodiment of the present invention. The torque transmission device 200 comprises an input disc 203*a* suitable for being rotatably coupled to a first rotating mechanical assembly. The input disc 203*a* is configured to extend in a plane perpendicular to a so-called central input axis X1. The input disc 203*a* comprises two transmission pins 231 and 232 extending parallel to the central input axis X1, from a first side of the input disc 203*a*, and in an axial direction. The transmission pins 231 and 232 are positioned equidistant from the central input axis X1. The transmission pins 231 and 232 are for example formed by cylindrical studs. The cylindrical studs can be fastened to the input disc 203*a*, for example by tight fitting, by welding or by crimping, or can be integrally formed with the input disc 203*a*. In the embodiment in FIGS. 1 and 2, the transmission pins 231 and 232 are positioned diametrically opposite each other relative to the central input axis X1, but other positions are also possible.

The torque transmission device 200 also comprises an output disc 203*c* suitable for being rotatably coupled to a second rotating mechanical assembly. The output disc 203*c* is configured to extend in a plane perpendicular to a so-called central output axis X3. The output disc 203*c* comprises two transmission pins 233 and 234 extending parallel to the central output axis X3, from a first side of the output disc 203*c*, and in an axial direction. The transmission pins 233 and 234 are positioned equidistant from the central output axis X3. The transmission pins 233 and 234 are for example formed by cylindrical studs. The cylindrical studs can be fastened to the output disc 203*c*, for example by tight fitting, by welding or by crimping, or can be integrally formed with the output disc 203*c*.

In the embodiment in FIG. 1, the transmission pins 233 and 234 are positioned diametrically opposite each other relative to the central output axis X3, but other positions are also possible.

The torque transmission device 200 also comprises an intermediate disc 203*b* positioned axially between the input disc 203*a* and the output disc 203*c*. The intermediate disc 203*b* can be seen more clearly in FIGS. 3*a*, 3*b* and 3*c*. The intermediate disc 203*b* is configured to extend in a plane perpendicular to a so-called intermediate central axis X2. The three discs 203*a*, 203*b* and 203*c* are positioned substantially coaxially so that the three axes X1, X2 and X3 can be aligned. The intermediate disc 203*b* comprises two transmission pins 235 and 236 extending from a first side of the intermediate disc 203*b* in an axial direction parallel to the intermediate central axis X2. This first side of the intermediate disc 203*b* is suitable for facing the side of the input disc 203*a* comprising the transmission pins 231 and 232. In the embodiment in FIG. 1, the transmission pins 235 and 236 are positioned diametrically opposite each other relative to the intermediate central axis X2, but other positions are also possible. The transmission pins 235 and 236 are positioned equidistant from the intermediate central axis X2.

The intermediate disc 203*b* comprises two more transmission pins 237 and 238 extending from a second side of the intermediate disc 203*b* in an axial direction parallel to the intermediate central axis X2. This second side of the intermediate disc 203*b* is suitable for facing the side of the output disc 203*c* comprising the transmission pins 233 and 234. In the embodiment in FIG. 1, the transmission pins 237 and 238 are positioned diametrically opposite each other relative to the intermediate central axis X2, but other positions are also possible. The transmission pins 237 and 238 are positioned equidistant from the intermediate central axis X2. In addition, the transmission pins 237 and 238 (driven) are offset by at least a quarter of a turn (behind relative to the normal direction of drive) relative to the transmission pins 235 and 236 (driving).

The transmission pins 235, 236, 237 and 238 of the intermediate disc 203*b* are for example formed by cylindrical studs. The cylindrical studs can be fastened to the intermediate disc 3*b*, for example by welding or by crimping, or can be integrally formed with the intermediate disc 203*b*. In this case, the intermediate disc 203*b* can include a local reinforced region on the opposite face from the transmission pin 235, 236, 237 and 238, in the form of a rectangular pad, visible in FIGS. 1, 2, 3*a*, 3*b*, 3*c*, in order to reinforce the flush-fitting of the transmission pins 235, 236, 237 and 238 in the web of the intermediate disc 203*b*.

The intermediate disc 203*b* can also comprise a collar 209, in particular in the central portion of the annular form of the intermediate disc, the collar 209 being able to extend axially on either side of the centre of the intermediate disc 203*b* to form a T-shaped cross-section. The T-shaped cross-section makes it possible to stiffen the intermediate disc 203*b* radially and prevent it from becoming out-of-round when the torque transmission device 200 is under load.

The torque transmission device 200 also comprises a first pair of links 205*a*, 205*b* positioned axially between the input disc 203*a* and intermediate disc 203*b*. The links 205*a* and 205*b* of the first pair are coupled by a first side to the input disc 203*a* and by a second side, opposite to the first side, to the intermediate disc 203*b*, via the transmission pins 231, 232, 235 and 236. The links 205*a* and 205*b* of the first pair comprise a first hole situated at a first end of the link 205*a*, 205*b* and configured to respectively receive a transmission pin 231, 232 associated with the input disc 203*a* and a second hole situated at a second end of the link 205*a*, 205*b* and configured to respectively receive a transmission pin 235, 236 associated with the intermediate disc 203*b*. Preferably, the links 205*a*, 205*b* of the first pair are positioned diametrically opposite each other relative to the intermediate central axis X2 (or relative to the central input axis X1), but a difference of a few degrees, for example 10°, relative to the diametrically opposed direction, can be acceptable.

The torque transmission device 200 also comprises a second pair of links 207*a*, 207*b* coupled by a first side to the intermediate disc 203*b* and by a second side, opposite to the first side, to the output disc 203*c*, via the transmission pins 233, 234, 237 and 238, the links 207*a*, 207*b* of the second pair being positioned diametrically opposite each other relative to the intermediate central axis X2.

The links 207*a* and 207*b* of the second pair comprise a first hole situated at a first end of the link 207*a*, 207*b* and configured to respectively receive a transmission pin 237, 238 associated with the intermediate disc 203*b* and a second hole situated at a second end of the link 207*a*, 207*b* and configured to respectively receive a transmission pin 233, 234 associated with the output disc 203*c*.

Preferably, the links 207*a*, 207*b* of the second pair are positioned diametrically opposite each other relative to the intermediate central axis X2 (or relative to the central output axis X3), but a difference of a few degrees, for example 10°, relative to the diametrically opposed direction, can be acceptable.

In addition, due to the position of the transmission pins 235, 236, 237 and 238 of the intermediate disc 203*b*, the two pairs of links 205*a*, 205*b*, 207*a*, 207*b* are aligned in two respective directions substantially perpendicular to each other, denoted d1 for the first pair 205*a* and 205*b* and d2 for the second pair 207*a*, 207*b* in FIG. 3*a*. Such positioning of the links 205*a*, 205*b*, 207*a*, 207*b* allows for torque transmission even if the central input axis X1 and the central output axis X3 are not coaxial. In addition, this transmission is in practice completely homokinetic as the transmission error generated cannot be measured experimentally. However, the calculation of the transmission error by numerical simulation or analytically gives a calculated transmission error<6.10-6 for a deliberately exaggerated eccentricity of the axes X1 and X3 of 1 mm, when the usual eccentricity will probably be less than one tenth of a mm. The homokinetic nature of this rotatable coupling is an essential factor in the quiet operation of the system in order to prevent pulsations due to periodic excitation in the transmission of torque.

In the embodiment disclosed, due to the position of the transmission pins 231, 232, 233, 234, 235, 236, 237, 238 (the transmission pins on one side of a disc 203*a*, 203*b*, 203*c* are positioned diametrically opposite each other), the links 205*a*, 205*b*, 207*a*, 207*b* work in tension in a first torque transmission direction and in compression in the opposite torque transmission direction (which is not used in the case of an application linked to a cycle crankset).

During torque transmission, the intermediate disc is simultaneously subjected to tensile force by the four links 205*a*, 205*b*, 207*a*, 207*b*, and the vector sum of these forces is substantially zero, resulting in the transmission of pure torque. However, as can be seen in FIG. 3*a*, the actions of the link 205*a* and the link 207*b* are substantially perpendicular, and the resultant of these two actions is a centripetal load directed along the mid-line of the two links 205*a*, 207*b*; the same applies symmetrically relative to the axis X2, to the other two links 205*b* and 207*a*, and the intermediate disc 203*b* is thus subjected to two opposite centripetal forces resulting in bending stress that tends to make the intermediate disc 203*b* out-of-round under the action of these two opposite centripetal forces. It is therefore desirable to reinforce and stiffen the web of this disc with a T-shaped cross-section (visible in FIGS. 6 and 10) provided by the collar 209 in order to reduce the deformation and stresses thereof while remaining very narrow, as the arms of the T corresponding to half of the height of the collar 209 are substantially the same thickness as the links positioned on each side. The links 205*a*, 205*b*, 207*a*, 207*b* are thus configured to be positioned in the space formed by the collar 209 on either side of the web of the intermediate disc 203*b* so that the collar 209 provides the intermediate disc 203*b* with increased stiffness without increasing the axial thickness of the torque transmission device 200. This intermediate disc 203*b* structure is thus particularly strong, compact and light.

In order to ensure a satisfactory connection between the links 205*a*, 205*b*, 207*a*, 207*b* and their respective pins 231, 232, 234, 235, 236, 237, 238, the pins must pass completely through the associated link and the ends thereof (which are preferably bevelled to facilitate assembly) must protrude by several tenths of a millimetre from the outer plane of the link so that the link cannot be ejected from its transmission pin. Eight recesses or cavities 211 are therefore made in the various discs 203*a*, 203*b*, 203*c*. The diameter of the recesses is larger than the diameter of the transmission pins 231, 232, 234, 235, 236, 237, 238 in order to accommodate with play the protruding end of the transmission pins 231, 232, 234, 235, 236, 237, 238.

As can be seen in FIGS. 1 and 2, the intermediate disc 203*b* and the output disc 203*c* are inserted into a recess made in the input disc 203*a*, the assembly being retained axially by a snap ring 213 that makes it possible to axially immobilize the coupling and in particular to prevent the links 205*a*, 205*b*, 207*a*, 207*b* from being axially ejected from their transmission pins 231, 232, 234, 235, 236, 237, 238.

When the links 205*a*, 205*b*, 207*a*, 207*b* are all working in tension, the intermediate disc 203*b* has a very stable single balanced position, so that if an attempt is made to move it away from its balanced position, it will tend to return to its balanced position by itself; conversely, when the links 205*a*, 205*b*, 207*a*, 207*b* are working in compression, for example by reversing the direction of the torque transmitted, if the intermediate disc 203*b* is moved away from its balanced position, it can diverge to an eccentric position in which drive will no longer be homokinetic, even though the friction tends to stabilize the intermediate disc when the input axis X1 and the output axis X3 are only slightly eccentric. It is therefore strongly recommended that torque causing the tensioning of the links 205*a*, 205*b*, 207*a*, 207*b* be transmitted with this type of coupling.

The links 205*a*, 205*b*, 207*a*, 207*b* used are for example standard chain links, in particular having a pitch of 9.525 mm (⅜ths of an inch), but other types of link can also be used. Using standard chain links makes it possible to reduce the production costs of the torque transmission device 200.

In the embodiment in FIGS. 1 and 2, in a first torque transmission direction, the links 205*a* and 205*b* of the first pair and the links 207*a* and 207*b* work in tension to transmit the torque between the input disc 203*a* and the output disc 203*c*, and in a second torque transmission direction, the links 205*a* and 205*b* of the second pair and the links 207*a* and 207*b* work in compression to transmit the torque between the input disc 203*a* and the output disc 203*c*. As stated above, in the case of one-way use (torque always transmitted in the same torque transmission direction, as is the case in a cycle), the torque transmission direction in which the links 205*a*, 205*b*, 207*a*, 207*b* work in tension will be preferred.

In addition, it must be noted that the links 205*a*, 205*b* of the first pair are rotatably mounted with respect to the transmission pins 231, 232 of the input disc 203*a* and with respect to the first transmission pins 235, 236 of the intermediate disc 203*b*, and the links 207*a*, 207*b* of the second pair are rotatably mounted with respect to the second transmission pins 237, 238 of the intermediate disc 203*b* and with respect to the transmission pins 233, 234 of the output disc 203*c* so that the intermediate central axis X2 can be offset relative to the central input axis X1 and the central output axis X3 can be offset relative to the intermediate central axis X2. The central output axis X3 can thus be offset in all directions relative to the central input axis X1.

The torque transmission device 200 described above thus makes it possible to rotatably couple two rotating mechanical assemblies that can be non-coaxial, that is, it is possible for the axis of rotation of the first rotating mechanical assembly to not be aligned with the axis of rotation of the second rotating mechanical assembly. However, the axes of rotation must be substantially aligned, that is, contained in a common cylinder the diameter of which is smaller than a few millimetres, for example smaller than 2 mm, for example 0.7 mm. The torque transmission device 200 thus acts like an Oldham coupler and makes it possible to transmit torque between two rotating mechanical assemblies without generating losses or noise even in the absence of coaxiality. In addition, using a torque transmission device 200 comprising a first pair of links connecting an input disc 203*a* and an intermediate disc 203*b*, and a second pair of links connecting an output disc 203*c* and the intermediate disc 203*b*, makes it possible to obtain a torque transmission device 200 with a reduced axial dimension, for example between 3.5 mm and 6 mm, as the thickness of the discs and of the links, which can be made from a high-strength steel, can be reduced, and the discs can be positioned close to each other.

One of the advantages of using pivoting links is that they greatly reduce the lost work of deformation due to the speed of sliding in the holes of the link being much lower than with a slider, as used in an Oldham coupler. The lost work of deformation is thus reduced by the ratio L/d, where L is the centre distance of the link and d is the diameter of the transmission pins; in our example L=9.525 mm and d=3.2 mm, giving a reduction ratio of one third. The friction coefficient and the wear of the pins can be considerably reduced by applying a nitriding treatment to the pins and/or links in order to optimize durable, low-friction operation of the coupling. Such a torque transmission device 200 is particularly suitable for use in a geared motor of an electric bicycle positioned in the crankset of the cycle so that the action of the cyclist, which tends to deform the bottom bracket shell and thus render the output of the geared motor and the crank axle non-coaxial, does not result in undesirable friction or noise. One example of such a geared motor comprising a torque transmission device 200 will be described in greater detail hereinafter.

FIG. 4 shows a cycle frame 100 comprising an electric power assistance device 101.

The electric power assistance device 101 includes a geared motor 1 mounted in a crankset 102 of the cycle, on the central crank axle 103, in a recess in the frame 100 (FIGS. 4 and 5).

In a manner known per se, the rotating central crank axle 103 is connected to the pedals (not shown) via two cranks 104. The crankset 102 also comprises at least one chain ring 105, here two, fastened to the end of one of the cranks 104 and configured to drive the chain driving the rear wheel of the cycle.

As can be seen more clearly in the axial cross-section in FIG. 6, the geared motor 1 comprises a reducer 2, an electric motor 3 and a torque transmission device 200, configured so that they can be mounted coaxially on the central axle 103.

The electric motor 3 includes a rotor 4 rigidly connected to a shaft 5 for rotation therewith, and a stator 6 fastened in a casing 7 of the geared motor 1, the casing 7 in turn being received and fastened in the frame 100.

The electric motor 3 is for example a brushless motor, the rotor 4 comprising permanent magnets rotating inside the stator 6 comprising windings, for example three-phase. The permanent magnets of the rotor 4 are fastened to the shaft 5. Sensors for detecting the angular position of the rotor 4 and of the central axle 103 of the crankset 102 further make it possible to control the electric motor 3.

The shaft 5 is tubular, that is, hollow, to allow the central axle 3 to pass through it, here connected to the cranks 104. It forms the input of the reducer 2.

The reducer 2 comprises a ring gear 10 rigidly connected to the casing 7 and therefore to the stator 6, a planet carrier 11 pivotably mounted via at least one flange bearing 22, 23 about the shaft 5, and at least two eccentric planet gears 12, 13 situated in two parallel planes. The ring gear 10 meshes in two different planes with the two planet gears 12, 13 on the inside of the ring gear 10. The planet carrier 11 forms the output of the reducer 2.

The planet gears 12, 13 are mounted on respective eccentric cams 14 via a respective bearing 15, and at least three pins 16 of the planet carrier 11 pass through them. The reducer 2 includes for example six pins 16. The eccentric cams 14 are rigidly connected to the shaft 5.

The reducer 2 is cycloidal and makes it possible to reduce the speed of the shaft 5 with a relatively high ratio in relatively compact dimensions. The shaft 5 drives the eccentric bearings 15, which in turn drive the planet gears 12, 13 in an eccentric cycloidal motion.

The planet gears 12, 13 mesh on the ring gear 10 and are rotatably offset. The planet gears 12, 13 include truncated cycloidal teeth (or involute gear teeth), here 45 in number, and the ring gear 10 includes teeth, here 46 in number, having cylinder portions (or involute portions) interacting with the shape of the planet gears 12, 13. These truncated cycloidal teeth can be seen in FIG. 7. The reducer 2 includes for example two planet gears 12, 13 rotatably offset by 180° (FIG. 6), or three planet gears offset from each other by 120° (not shown). Using a plurality of rotatably offset planet gears 12, 13 makes it possible to compensate for the radial forces exerted in particular on the planet gears 12, 13 due to the high torque output.

According to one embodiment, the planet carrier 11 includes a first flange 17 and a second flange 18 connected to each other by a series of spacers 19 (at least three), for example six spacers 19 (visible in the transverse cross-section in FIG. 7). These spacers 19 are fastened in each of the flanges 17, 18 by screws 20 passing through the spacers 19 (one screw 20 per spacer 19) connecting the two flanges 17, 18. The planet gears 12, 13 are axially interposed between the flanges 17, 18, the planet carrier 11 thus forming a cage coaxial with the shaft 5 and with the ring gear 10 for the eccentric planet gears 12, 13 by the eccentric cams 14.

The spacers 19 pass through the planet gears 12, 13 by means of openings 21, here six (as many openings 21 as spacers 19), for example cylindrical. There is sufficient play between the spacers 19 and the openings 21 so that they do not come into contact with each other. The openings 21 are evenly formed in a circle in the faces of the planet gears 12, 13.

The reducer 2 also includes at least one flange bearing 22, 23 for centring the planet carrier 11 about the shaft 5. For example, the reducer 2 includes a first flange bearing 22 interposed between the first flange 17 of the planet carrier 11 and the shaft 5, for centring the first flange 17, and a second flange bearing 23 interposed between the second flange 18 of the planet carrier 11 and the shaft 5, for centring the second flange 18 (FIG. 6).

The torque output from the reducer 2 is transmitted to the central crank axle 103 by means of the torque transmission device 200 making it possible to transmit the torque while tolerating slight radial misalignment. A free wheel 25 can be interposed between the output spindle 26 connected to the chain ring 105 of the cycle and the output of the torque transmission device 200. The free wheel 25 makes it possible in particular to decouple the geared motor 1 if the speed is too high or in the event of back-pedalling or slipping or when the cyclist no longer desires assistance.

The ring gear 10 is fastened to the casing 7 of the geared motor 1. The teeth of the ring gear 10 are for example made directly in the casing 7. The planet gears 12, 13 mesh with the "fixed" ring gear 10.

The pins 16 passing through the faces of the planet gears 12, 13 transmit the thrust exerted by the planet gears 12, 13 to the planet carrier 11, which is the output member of the reducer 2. The pins 16 (or output pins) rotate the output of the reducer 2, coaxially with the shaft 5, when the planet gears 12, 13 turn. The planet gears 12, 13 and the output rotate in the opposite direction to the shaft 5 and when the shaft 5 turns by one revolution, the planet gears 12, 13 shift angularly by one tooth in the other direction, driving the output at a lower rotation speed than the shaft 5, here forty-five times lower.

The pins 16 pass through all of the planet gears 12, 13. Each pin 16 is in contact with a hole 31 of each planet gear 12, 13, i.e. two holes 31 in the case of a reducer 2 with two planet gears 12, 13. As the pins 16 are cylindrical, the holes 31 must include at least one cylindrical portion in the direction transmitting the torque. The holes 31 are for example cylindrical.

The geared motor 1 can further include a pair of pin bearings 33 per pin 16, one pin bearing 33 being mounted at each end of the pins 16 (FIG. 6). There are thus twelve small pin bearings 33 received in the flanges 17, 18 of the planet carrier 11 of the geared motor 1 illustrated. The benefit of these pin bearings 33 is that they minimize the losses of each of the bushes of the pins 16 when they rotate under load. The pins 16 roll without sliding in the holes 31 of each of the planet gears 12, 13, thus minimizing the losses due to sliding under load.

The holes 31 of the planet gears 12, 13 are evenly arranged in a circle in the faces of the planet gears 12, 13, the holes 31 alternating with the openings 21 through which the spacers 19 pass (FIG. 7).

According to one embodiment, the geared motor 1 further includes a rotor bearing 34 configured to centre a first end of the shaft 5, the driving end (motor side), on a fixed axis of the geared motor 1 and a bearing device 36 including deformable rolling elements 37, the bearing device 36 being interposed between the planet carrier 11 and a cylindrical recess of the casing 7, for centring the shaft 5 in the cylindrical recess, at a second end, the driven end (FIGS. 6 and 9).

The cylindrical recess is formed in the casing 7. The casing 7 is fixed relative to the frame 100 of the cycle. The fixed axis is the axis of the cylindrical recess of the casing 7.

In the example in FIGS. 4 to 10, the deformable rolling elements 37 are interposed between the second flange 18 of the planet carrier 11 and the cylindrical recess of the casing 7. A seat receiving the deformable rolling elements 37 can be made in the planet carrier 11, in the second flange 18 and in the cylindrical recess of the casing 7.

The shaft 5 rigidly connected to the rotor 4 of the electric motor 3 for rotation therewith rotates on the rotor bearing 34 placed at one end thereof, the driving end, while the other driven end is left "free or floating" to be automatically centred by the opposing radial thrust of the planet gears 12, 13 (see schematic FIG. 9). This second end thus positions itself radially when significant transmission torque is transmitted.

Conversely, in phases of unloaded operation, that is when no transmission torque is transmitted or at low torque, the second driven end of the reducer 2 is automatically centred by the resilient deformable rolling elements 37.

Centring the second end using the deformable rolling elements 37 at low torque makes it possible to prevent the planet gears 12, 13 from drifting or rather fluttering in their clearance space, which could then cause an unpleasant noise; in their absence, the reducer 2 could not preposition itself appropriately, which could also damage the teeth.

The automatic centring of the shaft 5 by the deformable rolling elements 37 makes it possible for it to no longer be rigidly guided radially at its second end on the side of the planet gears 12, 13 by a ball bearing as in the prior art. Conversely, in the invention illustrated schematically in FIG. 9, this second end is left to centre automatically until the radial forces generated by each of the planet gears 12, 13 are balanced. This balance is made possible by the freeing of two degrees of freedom in a planar motion substantially normal to the axis of rotation of the rotor 4.

In addition, the automatic centring of the planet gears 12, 13 makes it possible to improve the distribution of the torque transmitted by each of the planet gears 12, 13. This improved distribution of the torque makes it possible to produce a geared motor 1 with reduced production precision, which facilitates production and reduces manufacturing costs. Likewise, the eccentric cams 14 of the planet gears 12, 13 no longer have to be perfectly offset from each other. This type of defect is no longer at all problematic as the shaft 5 automatically centres itself in the middle of the eccentric cams 14 due to the balance of the radial forces of the planet gears 12, 13. In addition, the absence of rigid radial guidance on the side of the planet gears 12, 13 makes it possible for the potential asymmetry of the torque transmitted between the planet gears 12, 13 to no longer generate radial overloading of the bearing on the side of the planet gears 12, 13 resulting in noise, losses of efficiency and increased wear.

It goes without saying that in order to allow a small planar displacement of the planet gears 12, 13, sufficient play must be provided in the meshing of the planet gears 12, 13 in the ring gear 10.

According to one embodiment, the deformable rolling elements 37 are mounted radially prestressed on the raceway so that the bearing does not have any initial radial play. This prestressing must not however hinder the automatic centring of the planet gears 12, 13 in the case of high torque. The deformable rolling elements 37 are therefore deformable in the elastic range and they must retain their elastic properties, in particular over time and in the entire operating temperature range (avoiding any stress relaxation and/or creep phenomenon).

Preferably, the deformable rolling elements 37 have sufficient radial prestressing so that in all extreme cases of maximum play between the planet carrier 12, 13, the deformable rolling elements 37 and the cylindrical recess, the nominal diameter of the deformable rolling elements 37 is such that there is no radial play. In this case, the deformable rolling elements 37 must have sufficient radial elasticity in order to accept the radial deformation imposed this time by the compression assembly, to which the radial travel necessary for automatic centring is also added.

It is however possible to tolerate limited radial play, that is, without initial prestressing of the deformable rolling elements 37, in order to limit the amplitude of the potential radial flutter of the planet gears 12, 13 in the ring gear 10, but this play must then be less than the radial play of the planet gears 12, 13 in the ring gear 10.

In the example in FIGS. 4 to 10, the rotor bearing 34 is interposed between the shaft 5 and the stator 6 of the electric motor 3 for centring the shaft 5 at the first driving end of the geared motor 1, the shaft 5 being mounted independently of the central axle 103, in particular with sufficient radial play to prevent any contact (FIG. 6 and schematic FIG. 9).

With this assembly, the geared motor 1 is completely isolated from the central axle 103. The shaft 5 mounted independently of the central axle 103 is automatically centred by the deformable rolling elements 37.

As can be seen more clearly in schematic FIG. 9, the shaft 5 is guided only at the first driving end by the rotor bearing 34 centred in the stator 6 of the electric motor 3, the planet gears 12 and 13 being pivotably mounted on their respective eccentric cams 14 and meshing in the ring gear 10 connected to the casing 7 (the deformable rolling elements are not shown in this diagram in order to facilitate understanding). The planet gears 12, 13 are thus automatically centred due to the balance of the radial forces generated by the thrust of their respective teeth during torque transmission. The planet carrier 11, which is also centred on the shaft 5, transmits the torque output to the central axle 103 of the crankset 104 by means of the torque transmission device 200 (shown schematically in a simplistic manner in FIG. 9 to illustrate that radial displacement is possible between the planet carrier 11 and the central axle 103 of the crankset). This automatic centring of the shaft 5 and of the planet carrier 11 containing the planet gears 12, 13 is made possible by the torque coupling device 200, which allows its input axis X1, forming the output of the geared motor 1, to automatically centre freely without being hindered by the radial displacement of its output axis X3 embodied by the central axle 103, which is displaced radially due to the pedalling forces.

As stated in the introduction, the use of a known Oldham coupling with sliders generating friction causes alternating radial forces the direction, orientation and intensity of which varies four times per revolution. The use of this type of coupling at the output of the reducer 2 generates radial forces that tend to oppose the free automatic centring of the planet gears 12, 13 as they mesh in the ring gear 10. Unlike the sliders, the use of pivoting links 205*a*, 205*b*, 207*a*, 207*b* generates considerably reduced radial forces, making operation much freer and therefore quieter.

According to one embodiment, the deformable rolling elements 37 are formed by a series of tubular rollers positioned in a circle with respective axes parallel to each other and to an axis of the shaft 5 (FIG. 8). The tubular rollers (or rolls or tubes) are cylindrical parts, that is, hollow, which makes it possible to increase their radial compressive flexibility and to reduce the stresses when they become out-of-round by a few hundredths of a mm.

The tubular rollers are for example designed to allow a radial displacement of between 0.02 mm and 0.15 mm without any risk of fatigue damage for the entire service life of the geared motor 1.

When the reducer 2 transmits torque under load, the tubular rollers must be sufficiently radially flexible so that they do not oppose the automatic centring of the planet gears 12, 13 of the reducer 2 so that they can find their radial balance without excessive stress. The radial stiffness of the tubular rollers must be sufficient for the deformable rolling elements 37 to be able to deform in order to allow a certain displacement of the reducer 2, while being stiff enough to be able to centre the reducer 2.

During operation, the tubular rollers rotate on themselves like a ball or roller bearing. This rotation causes the tubular walls of the rollers to work in rotating bending as the tubular walls deform alternately in tension and then in compression; the tubular roller must therefore be designed with preferably unlimited fatigue strength.

The bearing device 36 includes for example between ten and fifty deformable rolling elements 37. Increasing the number of deformable rolling elements 37 makes it possible to increase the initial radial stiffness of the reducer 2 without loss of torque.

According to one embodiment, the deformable rolling elements 37 are made from a polymer material, such as a thermoplastic material, such as PEEK or PAI.

A number of polymer materials, and more particularly the thermoplastic materials PEEK and PAI, are able to retain their properties at high temperatures and are not susceptible to creep. They can withstand mechanical and temperature stresses without losing their elasticity. The heat generated by the losses of the electric motor 3 and the reducer 2 can require the geared motor 1 to operate at high temperatures (up to 90° C.). When the deformable rolling elements 37 remain static for a long period, resistance to creep and/or stress relaxation means that they do not become out-of-round and generate torque that prevents them from restarting. Using PEEK or PAI therefore makes it possible to retain very stable prestressing over time.

In addition, PEEK and PAI have particularly low mechanical hysteresis, which means that the energy loss linked to their cyclical deformation and to the rolling of the deformable rolling elements 37 is negligible, which thus provides a connection without significant friction.

A number of thermoplastic materials including PEEK, PAI and POM also have very good tribological properties that mean that the deformable rolling elements 37 can roll directly on a raceway made from example from an aluminium alloy, without a surface coating. It is then possible to machine the raceway through a simple turning operation, directly in a flange 18 of the planet carrier 11 or in the cylindrical recess of the housing 7, which makes this rotational guiding function very simple and cheap to produce.

The bearing device 36 includes for example a series of identical deformable rolling elements 37, for example tubular rollers, positioned side by side (FIG. 8). The deformable rolling elements 37 are positioned with play in the raceway, allowing them to become out-of-round.

By way of example, the deformable rolling elements 37 are PEEK tubular rollers with a diameter of 7.4 mm and a length of 3.8 mm, and have a tubular wall thickness of 0.65 mm, which gives them a diametral stiffness of 60 N/mm. There are for example 26 PEEK tubular rollers having a stiffness K=60 N/mm, i.e. a radial stiffness of the bearing of 780 N/mm.

The cylindrical recess of the casing 7 has a diameter of 72.62 mm±0.015 mm, and the diameter of the shaft of the planet carrier 11 of the reducer 2 is 58 mm 0.01 mm. The nominal compression of the tubular rollers (prestressing) is therefore (72.62−58)/2−7.4=7.31−7.4=0.09 mm±0.04 mm), which generates a radial force of 60×0.09=5.4 N, which is a stress level that PEEK is entirely capable of withstanding for an almost infinite period without the risk of relaxation at operating temperature (maximum permanent stress of the order of 20 MPa).

Deformable rolling elements 37 made in the form of tubular rollers made from a polymer material are extremely light compared to solid steel balls or rollers, as they are approximately six times less dense than steel and they are hollow instead of solid. A tubular roller made from a polymer material thus weighs for example in the region of 0.1 g (0.07 g for a PEEK tubular roller), that is, less than 3 g for a set of twenty-six PEEK tubular rollers, without any additional weight for the raceways as they can be machined directly in the parts. This structure in which the deformable rolling elements 37 are hollow polymer rollers therefore makes it possible to produce a particularly light geared motor 1.

According to another example, the deformable rolling elements 37 are metal tubular rollers. The tube walls are therefore thinner as the moduli of elasticity are significantly greater than with polymer materials. These deformable rolling elements 37 are for example made from a copper alloy (brass or bronze) or an aluminium alloy or a titanium or steel alloy. However, surface coatings or treatments of the raceways and/or of the deformable rolling elements and lubrication are preferably provided in this case, in order to avoid any problems of wear due to fretting corrosion linked to the metal/metal contact interfaces.

Although the invention has been described with reference to an electric power assistance device for a cycle, the invention also applies to any equipment comprising an electric power assistance device including a geared motor, such as an exoskeleton, portable electrical equipment or a robotic arm.

In addition, the torque transmission device 200 can be used in other types of geared motor or other mechanical assemblies requiring torque transmission between two elements that can be non-coaxial.

The invention claimed is:

1. A torque transmission device comprising:

an input disc extending in a plane perpendicular to a central input axis, an output disc extending in a plane perpendicular to a central output axis, an intermediate disc positioned between the input disc and the output disc and extending in a plane perpendicular to an intermediate central axis, a first pair of links coupled by a first side to the input disc and by a second side, opposite to the first side, to the intermediate disc, the links of the first pair being positioned diametrically opposite to each other relative to the intermediate central axis, a second pair of links coupled by a first side to the intermediate disc and by a second side, opposite to the first side, to the output disc, the links of the second pair being positioned diametrically opposite to each other relative to the intermediate central axis of the intermediate disc, the two pairs of links being aligned in two respective directions perpendicular to each other so as to allow torque transmission even when the central input axis and the central output axis are not coaxial, in which the input disc comprises two transmission pins extending parallel to the central input axis and received in two respective first holes associated with a first end of the respective links of the first pair, the intermediate disc comprising two first transmission pins extending parallel to the intermediate central axis of the intermediate disc, positioned on a first face of the intermediate disc and received in two respective second holes associated with a second end of the respective links of the first pair, and two second transmission pins extending parallel to the intermediate central axis of the intermediate disc, positioned on a second face of the intermediate disc and received in two respective first holes associated with the first side of the respective links of the second pair, the output disc comprising two transmission pins extending parallel to the central output axis and received in two respective second holes associated with the second side of the respective links of the second pair, and in which the first and second transmission pins of the intermediate disc are positioned so that the links of the first and second pairs work in tension in a first torque transmission direction and in compression in a second torque transmission direction, opposite to the first torque transmission direction, wherein the first pair of links are the only links positioned directly between the input disc and the intermediate disc, and wherein the second pair of links are the only links positioned directly between the intermediate disc and the output disc.

2. The torque transmission device according to claim 1, in which the links of the first pair are rotatably mounted with respect to the transmission pins of the input disc and with respect to the first transmission pins of the intermediate disc, and the links of the second pair are rotatably mounted with respect to the second transmission pins of the intermediate disc and with respect to the transmission pins of the output disc.

3. The torque transmission device according to claim 1, in which the links are standard chain links.

4. The torque transmission device according to claim 1, in which the intermediate disc comprises a collar extending axially on either side of the centre of the intermediate disc so as to form a T-shaped cross-section in order to prevent said intermediate disc from becoming out-of-round when the torque transmission device is under load.

5. The torque transmission device according to claim 4, in which the links are positioned in the thickness formed by the collar of the intermediate disc.

6. The torque transmission device according to claim 1, in which the transmission pins are protruding relative to the links and recesses are made in the input disc, the intermediate disc and the output disc facing the transmission pins associated with an adjacent disc to allow the transmission pins to protrude.

7. An electric power assistance device, comprising:

an electric motor comprising an output shaft and configured to be mounted about a central axle, a reducer configured to be mounted about the central axle, a free wheel configured to be mounted about the central axle, the torque transmission device according to claim 1, configured to be mounted about the central axle, the reducer, the free wheel and the torque transmission device forming a torque transmission line between the output shaft of the electric motor and an output spindle of the electric power assistance device.

8. The electric power assistance device according to claim 7, in which the reducer comprises an input configured to be rotatably coupled to the output shaft of the electric motor and an output configured to be rotatably coupled to the input disc of the torque transmission device.

9. The electric power assistance device according to claim 7, in which the free wheel comprises an input configured to be rotatably coupled to the output disc of the torque transmission device and an output configured to be rotatably coupled to the output spindle of the electric power assistance device.

10. The electric power assistance device according to claim 7, in which the electric power assistance device is a cycle and a central crank axle of the cycle is held in position by a single pair of bearings positioned between a frame of the cycle and the central crank axle.

11. The electric power assistance device according to claim 7, in which the electric motor, the reducer, the torque transmission device and the free wheel are configured to be positioned adjacent to each other along a central crank axle.

12. A cycle comprising:

a frame, a central crank axle rotatably mounted on the frame, and the electric power assistance device according to claim 7.

13. The cycle according to claim 12, in which the electric motor and the reducer are mounted on the frame independently of the central crank axle.

* * * * *